United States Patent [19]

Chen

[11] Patent Number: 5,841,859

[45] Date of Patent: Nov. 24, 1998

[54] STRUCTURE OF A TELEPHONE RECEIVER

[76] Inventor: Ping Huang Chen, No. 77, Hsia Cho, Kuo Ko, Hsi-An Li, Pu-Tai Cheng, Chia Yi Hsisn, Taiwan

[21] Appl. No.: 773,962

[22] Filed: Dec. 26, 1996

[51] Int. Cl.$^6$ ..................................................... H04M 1/00
[52] U.S. Cl. ............................................ 379/433; 379/430
[58] Field of Search .................................. 379/430, 433, 379/428, 449; 381/183, 187

[56] References Cited

U.S. PATENT DOCUMENTS 5,003,589   3/1991   Chen ........................................ 379/430

*Primary Examiner*—Jack Chiang
*Attorney, Agent, or Firm*—Bacon & Thomas, PLLC

[57] ABSTRACT

A structure of a telephone receiver mainly comprises a transmission portion, a receiving portion and an expansion bracket connected therebetween wherein a transmitter and a receiver are installed on the two sides of the end portions of said transmission portion and said receiving portion, respectively. Each of said transmission portion and said receiving portion is installed with a positioning piece, respectively, and said expansion bracket is formed by a plurality of serially connected relatively pivotable linking pieces which are alternately crossed, the two end portions of said expansion bracket are connected with said position pieces, respectively. By contracting and extending said bracket, the distance between said transmission portion and said receiving portion may be prolonged so that the distance between said transmission portion and said receiving portion is such that the telephone receiver may be hang on the two ears of a user, and by contracting expansion bracket, the distance between said transmission portion and said receiving portion is shorten so that said shorter expansion bracket may be arranged within the spaces of said transmission portion and said receiving portion to form as a normal length telephone receiver. Therefore, the telephone receiver of the present invention may be separated to hang on the two ears or be combined to form as integral body.

5 Claims, 3 Drawing Sheets

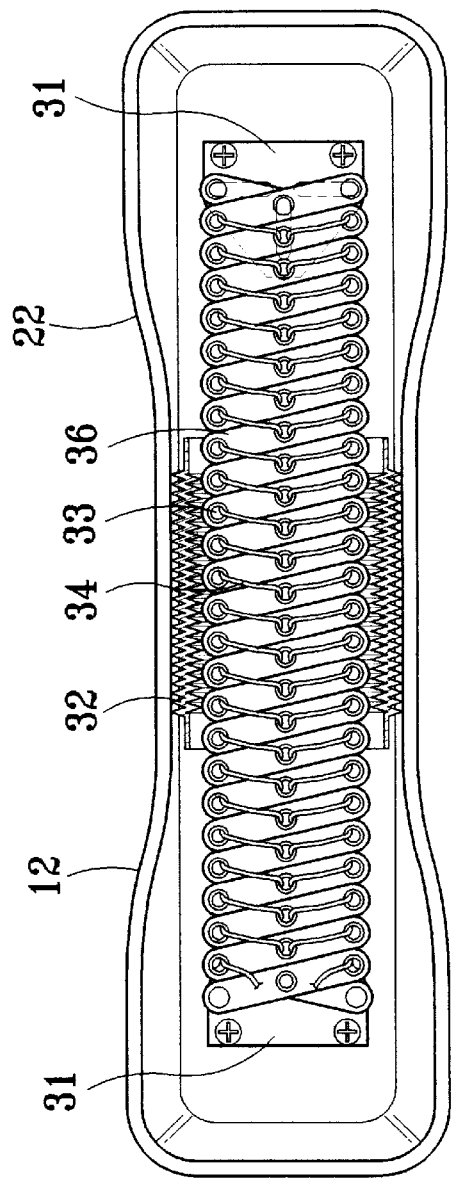
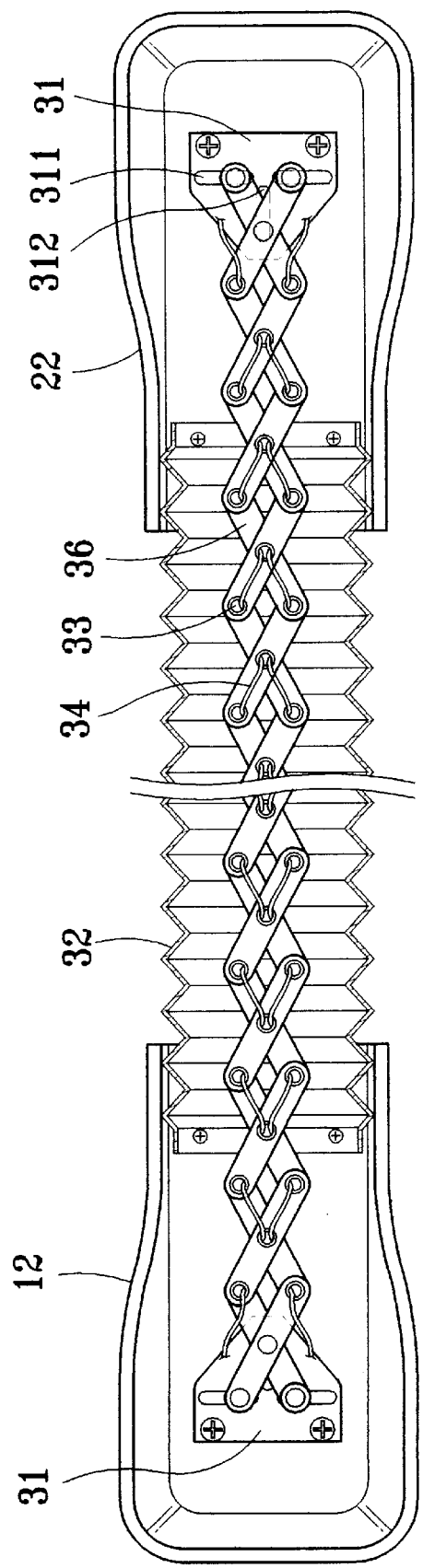
FIG. 2
FIG. 3

STRUCTURE OF A TELEPHONE RECEIVER

BACKGROUND OF THE INVENTION

1. Field of the Invention

The present invention is related to a structure of a telephone receiver, especially, to a design in which an expansion bracket connecting between a transmission portion and a receiving portion is formed by a plurality of serial relatively pivotable linking pieces which are alternately crossed, by the contraction and extension of said expansion bracket, the distance between the transmission portion and the receiving portion may be changed, so that the telephone receiver may be used normally and may be separated to hang on the two ears.

2. Description of the Prior Art

In the conventional hand held telephone receiver, since the user must hold the telephone receiver near to the face for listening through the transmission portion and talking through a receiving portion by hand. Therefore, as the user is talking by telephone and also has something must be treated by hands, then some difficult are induced. For solving such kind of troublesome problem, the inventor of the present invention has designed a dual usage telephone receiver which may be held by hand or be hang on the two ears, for example, U.S. Pat. Nos. 4,907,266 and 5,003,589. Actually, said telephone receiver has improved said troublesome problem induced from the conventional hand held telephone receiver so that the usage of telephone receiver has been enlarged. However, there are some defects in this kind of telephone receiver which must be solved so that the applications of the telephone receiver can be improved.

SUMMARY OF THE INVENTION

The object of the present invention is to provide a structure of telephone receiver mainly comprising a transmission portion, a receiving portion and a expansion bracket connected therebetween, wherein a expansion bracket is formed by a plurality of serially connected relatively pivotable linking pieces which are alternately crosses, the two end portions of said expansion bracket are installed within the cases of a transmission portion and a receiving portion, respectively. By extending said expansion bracket, the distance between said transmission portion and said receiving portion may be prolonged so that the distance between said transmission portion and said receiving portion is such that the telephone receiver may be hang on the two ears of a user, and by contracting expansion bracket, the distance between said transmission portion and said receiving portion is shorten so that said shorter expansion bracket may be arranged within the spaces of said transmission portion and said removing portion to form as a normal length telephone receiver. Therefore, the telephone receiver of the present invention may be separated to hang on the two ears or be combined to form as a integral body.

Another object of the telephone receiver of the present invention is to provide an extension bar on the bottom of said transmission portion, which is connected with a secondary transmitter. As the expansion bracket is extended so that the transmission portion and the receiving portion are hung on the two ears of a user, the ending bar may be withdrew in order that the secondary transmitter may be extended to the side of mouth for receiving the voice signal form user's speech.

A further object of the telephone receiver of the present invention is provide a buckle and a buckle base, which are installed on the upper and lower sides on the contact surface of the transmission portion and the receiving portion so that the transmission portion and the receiving portion may be steadily buckled together.

BRIEF DESCRIPTION OF THE DRAWINGS

The invention, as well as its many advantages, may be further understood by the following description and drawings in which:

FIG. 2 shows the contraction state of the expansion bracket of the present invention.

FIG. 3 shows the complete extension state of the expansion bracket of the preset invention.

DETAILED DESCRIPTION OF THE PREFERRED EMBODIMENT

Figure 1:
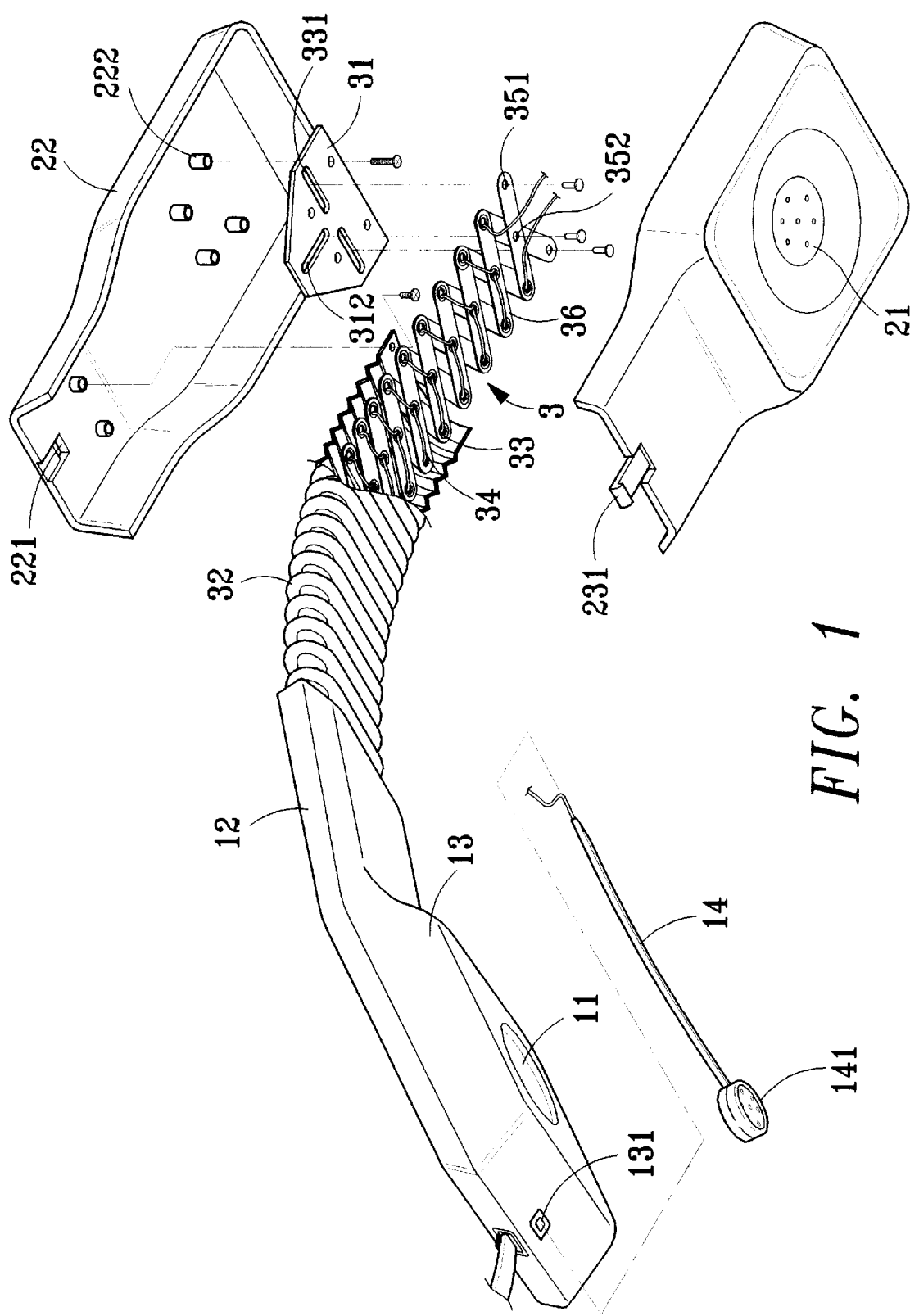
FIG. 1 is a structural exploded view of the present invention.

FIG. 1 is a structural exploded view of the present invention, as shown in the figure, it is apparent that the telephone receiver of the present invention mainly comprises: a transmission portion, a receiving portion, a expansion bracket 3, etc., wherein said receiving portion is constructed by a receiver 21 being sandwiched between a lower cover 23 of the receiving portion and an upper cover 22 of the receiving portion. A buckling base 221 is installed on one end of said upper cover 22 of said receiving portion, and a plurality of screw hole base 222 is installed on the other end thereof for locking a positioning piece 31. The receiver 21 is installed on one end side of the lower cover 23 of the receiving portion, and a buckle 231 which is symmetric to a buckle base 221 of the upper cover 22 of the receiving portion is installed on the other side thereof. Said transmission portion 1 is constructed by a primary transmission 11 being sandwiched between a upper cover 12 of the transmission portion and a lower cover 13 of the transmission portion and is fixedly installed with a positioning piece. A buckle and a buckle base are installed on the contacting surface between the upper cover 12 of the transmission portion and the lower cover 13 of the transmission portion, and the buckle base 22 of the upper cover 221 of the receiving portion and the buckle 231 of the lower cover 23 of receiving portion for engaging with the receiving portion 2. A hole 131 is installed on the other end of lower cover 13 of the receiving portion so that an extending bar 14 may be extended out to connect with a secondary transmitter 141. Said expansion bracket 3 is formed by a plurality of linking pieces 36 which are pivotably connected end to end, serially in other words, and alternately crossed. A first positioning hole 351 and a second positioning hole 352 are installed on the crossing points of two sides of the linking pieces 36, respectively. A longitudinal sliding slot 312 which is longitudinal with respect one of the two horizontal opposite positioning piece 31 is installed on each of the positioning pieces 31 which are fixedly locked on the upper cover 22 of the receiving portion which is locked within a transverse sliding slot 311 and the second sliding slot 312 of the positioning piece 31 by a plurality of rivets penetrating through the first positioning hole 351 and the second positioning hole 352 of the expansion bracket 3, and on the each of crossing contact of the crossing linking pieces 36 which is contact with the rivet is installed with a rivet hole 33 for the conducting line 34 to penetrate therethrough. The outer peripheral of the expansion bracket 3 is positioned on the transmission portion 1 on one end and the receiving portion 2 for engaging with a serpentine pipe 32.

FIG. 2 and 3 are a schematic view showing that the expansion bracket is in the complete contraction and extension states, respectively. As shown in the figure, As the telephone receiver of the present invention which is in using or is unused is located in the telephone receiver base by the engagement of the transmission portion 1, the buckling base 221 on the contact surface of the receiving portion 2 and buckle 231, the transmission portion 1 and the receiving portion 2 are combined as an integral body to form a generally used telephone receiver (as shown in the FIG. 2). As the transmission portion 1 and the receiving portion 2 are separated and are pulled away, and the separation are extending along the extension of the expansion bracket so that the distance between the transmission portion 1 and the receiving portion 2 is approximately equal to the distance between two ears of a human being. While the serpentine pipe 32 may be extended along the transmission portion 1 and the receiving portion 2 for protecting said expansion bracket 3 (as shown in the FIG. 3). When the expansion bracket 3 is contracted or extended, the first positioning hole 351 and the second positioning hole 352 on the respective positions of the sides thereof are also changed, which may be absorbed by the transverse sliding slot 311 and the longitudinal sliding slot 312.

Figure 4:
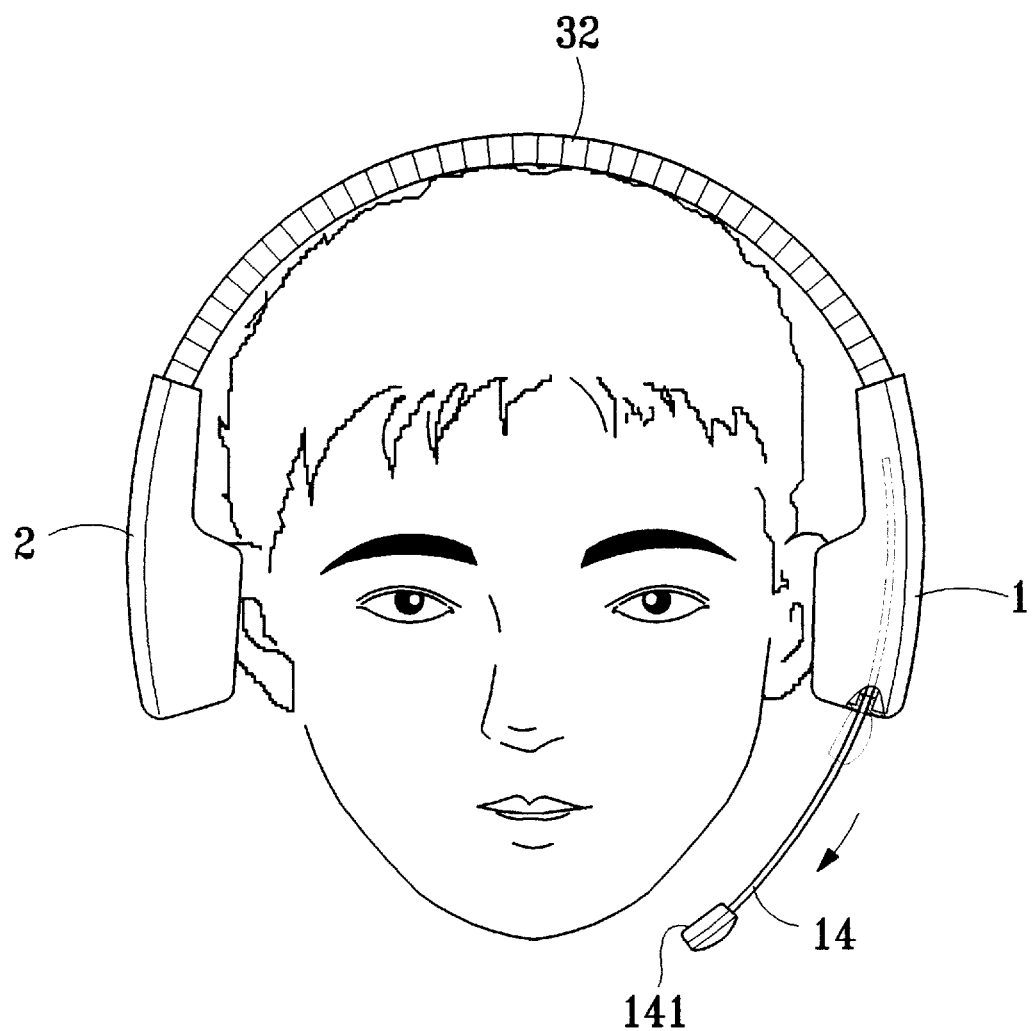
FIG. 4 is an application embodiment of the present invention.

FIG. 4 shows a preferred embodiment of the present invention. It is appreciated from the figure that the linking pieces 36 forming said expansion bracket 3 is slightly curved. Therefore when the transmission portion 1 and the receiving portion 2 are separated and is pulled away to a proper distance, the expansion bracket 3 is formed as a proper curve so that the transmission portion 1 and the receiving portion 2 may be hung on the two ears, and then the secondary transmitter 141 is internally connected to the mouth through transmission portion 1, therefore it is needless to hold the telephone receiver by hand when talking through a telephone receiver.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A structure of a telephone receiver, comprising:

a transmission portion;

a receiving portion;

a transmitter installed on one side of an end portion of said transmission portion;

a receiver installed on one side of an end portion of said receiving portion;

a first positioning piece mounted in said transmission portion;

a second positioning piece mounted in said receiving portion; and an expansion bracket formed by a plurality of serially connected relatively pivotable linking pieces which are alternately crossed, said expansion bracket having a first end and a second end which are connected to said first and second positioning pieces, respectively, such that said expansion bracket is connected between said transmission portion and said receiving portion;

wherein the crossing angles between said linking pieces and the length of said expansion bracket are changed by contraction and expansion of said expansion bracket so that said transmission portion and said receiving portion are combinable to form an integral body and, alternatively, are separable to hang over the respective ears of a user.

2. The structure of a telephone receiver according to claim 1, further comprising:

a hole formed in one end of said transmission portion;

an extension bar connected at one end to said transmission portion having another end which is extendable from said hole; and a secondary transmitter attached to said extendable end of said extension bar;

wherein said extension bar is extendable from said hole so that said secondary transmitter is positioned near the mouth of a user when said transmission portion and said receiving portion are hung over the respective ears of said user.

3. The structure of a telephone receiver according to claim 1, further comprising:

a rivet hole formed at each crossing point of said linking pieces; and a conducting line which penetrates through said rivet holes and extends from said receiving portion to said transmission portion.

4. The structure of a telephone receiver according to claim 1, wherein said positioning pieces include a respective pair of transverse sliding slots to which two linking pieces at said respective ends of said expansion bracket are slidably connected and a respective longitudinal sliding slot to which said crossing point of said two linking pieces is slidably connected.

5. The structure of a telephone receiver according to claim 1, wherein said transmission portion and said receiving portion each include a respective buckling portion formed on a connection portion thereof such that said buckling portions cooperate to releasably secure said transmission portion and said receiving portion together when they are combined to form an integral body.

* * * * *